(12) United States Patent
Graf et al.

(10) Patent No.: US 7,074,156 B2
(45) Date of Patent: Jul. 11, 2006

(54) DRIVETRAIN ON A MOTOR VEHICLE AND METHOD FOR CONTROLLING A DRIVETRAIN

(75) Inventors: Friedrich Graf, Sinzing (DE); Stefan Lauer, Pettendorf-Kneiting (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 10/863,034

(22) Filed: Jun. 8, 2004

(65) Prior Publication Data

US 2004/0224817 A1 Nov. 11, 2004

Related U.S. Application Data

(63) Continuation of application No. PCT/DE02/04559, filed on Dec. 12, 2002.

(30) Foreign Application Priority Data

Dec. 13, 2001 (DE) ................ 101 61 299

(51) Int. Cl.
*B60W 10/02* (2006.01)
*B60K 1/00* (2006.01)
(52) U.S. Cl. .......................... 477/5; 180/65.4
(58) Field of Classification Search ............ 477/3, 477/5; 180/65.2–65.4
See application file for complete search history.

(56) References Cited

U.S. PATENT DOCUMENTS

| | | | |
|---|---|---|---|
| 5,562,565 A * | 10/1996 | Moroto et al. ............. | 477/3 |
| 5,656,921 A | 8/1997 | Farrall ....................... | 322/40 |
| 6,183,389 B1 * | 2/2001 | Tabata ........................ | 477/5 |
| 6,188,945 B1 * | 2/2001 | Graf et al. ............. | 180/65.2 |
| 6,258,001 B1 * | 7/2001 | Wakuta et al. ............. | 475/5 |
| 6,299,563 B1 * | 10/2001 | Shimasaki .................. | 477/5 |
| 6,510,370 B1 * | 1/2003 | Suzuki et al. .......... | 180/65.2 |
| 6,616,569 B1 * | 9/2003 | Hoang et al. .............. | 477/3 |
| 6,672,415 B1 * | 1/2004 | Tabata .................. | 180/65.2 |
| 2004/0102286 A1 * | 5/2004 | Tabata et al. ............. | 477/3 |

FOREIGN PATENT DOCUMENTS

| | | |
|---|---|---|
| DE | 196 48 055 A1 | 6/1998 |
| DE | 199 21 920 A1 | 11/2000 |
| DE | 100 26 471 A1 | 1/2001 |
| EP | 1 122 109 A2 | 8/2001 |
| WO | WO 00/20242 | 4/2000 |

OTHER PUBLICATIONS

Probst G. et al.; "Architektur des Integrierten Antriebsstrangmanagement unter funktionellen Aspekten und mit Berücksichtigung der Steuergerätetopologie im Kraftfahrzeug"; 10 Aaachener Kolloquium Fahrzeug- und Motorentechnik; p. 1027-1040, 2001.

* cited by examiner

*Primary Examiner*—Roger Pang
(74) *Attorney, Agent, or Firm*—Baker Botts L.L.P.

(57) ABSTRACT

The drivetrain of a motor vehicle with an engine, a crankshaft starter-generator, a hydrodynamic torque converter and an automatic gearbox, comprises an overriding drivetrain controller (20) with a driver and situation recognition (31), a status controller (34) and a torque management (35). The controller carries out the following functions: a start-stop operation, an increase in engine torque, a rolling of the vehicle on a non-engaged drivetrain and a regenerative braking operation.

7 Claims, 6 Drawing Sheets

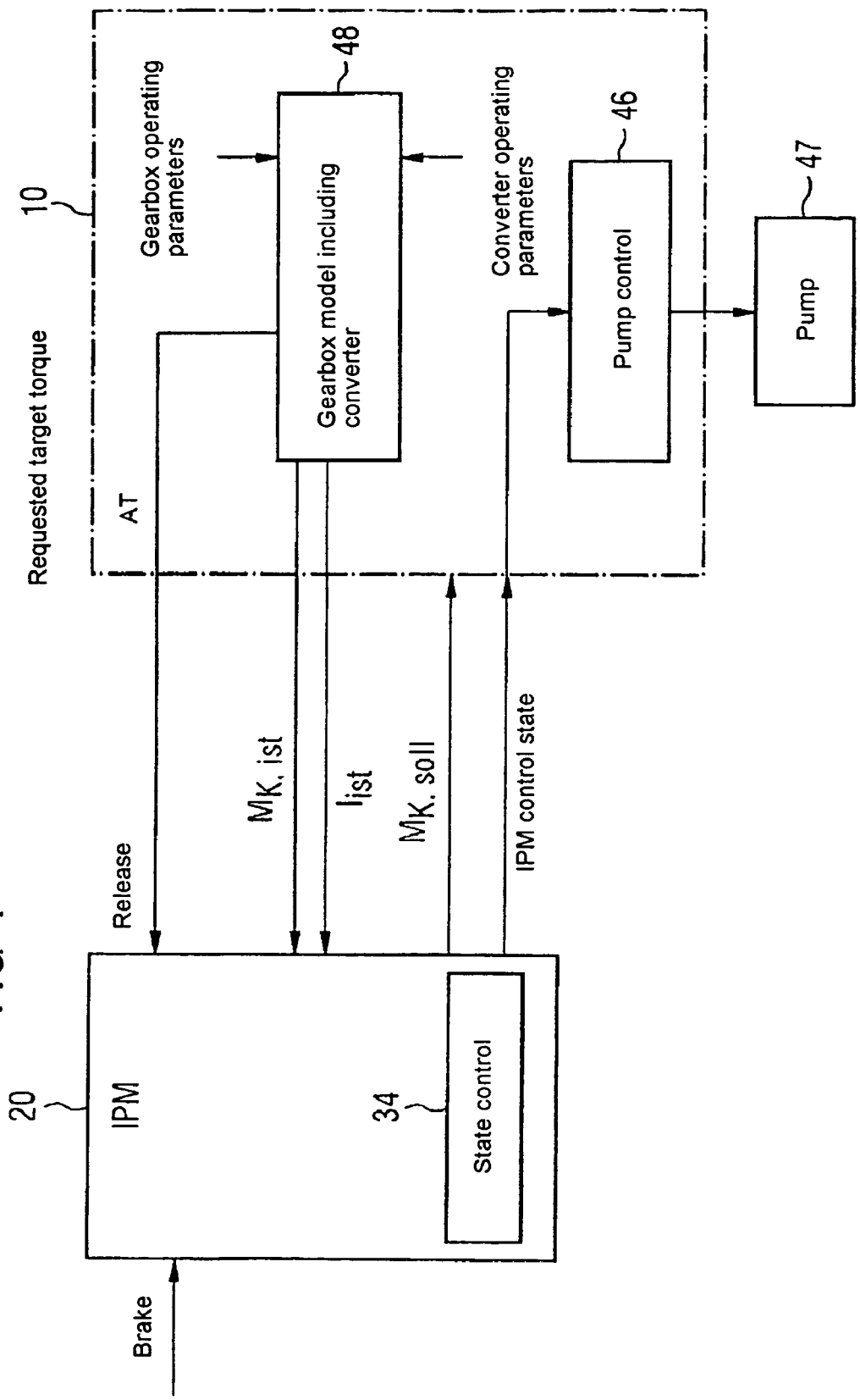

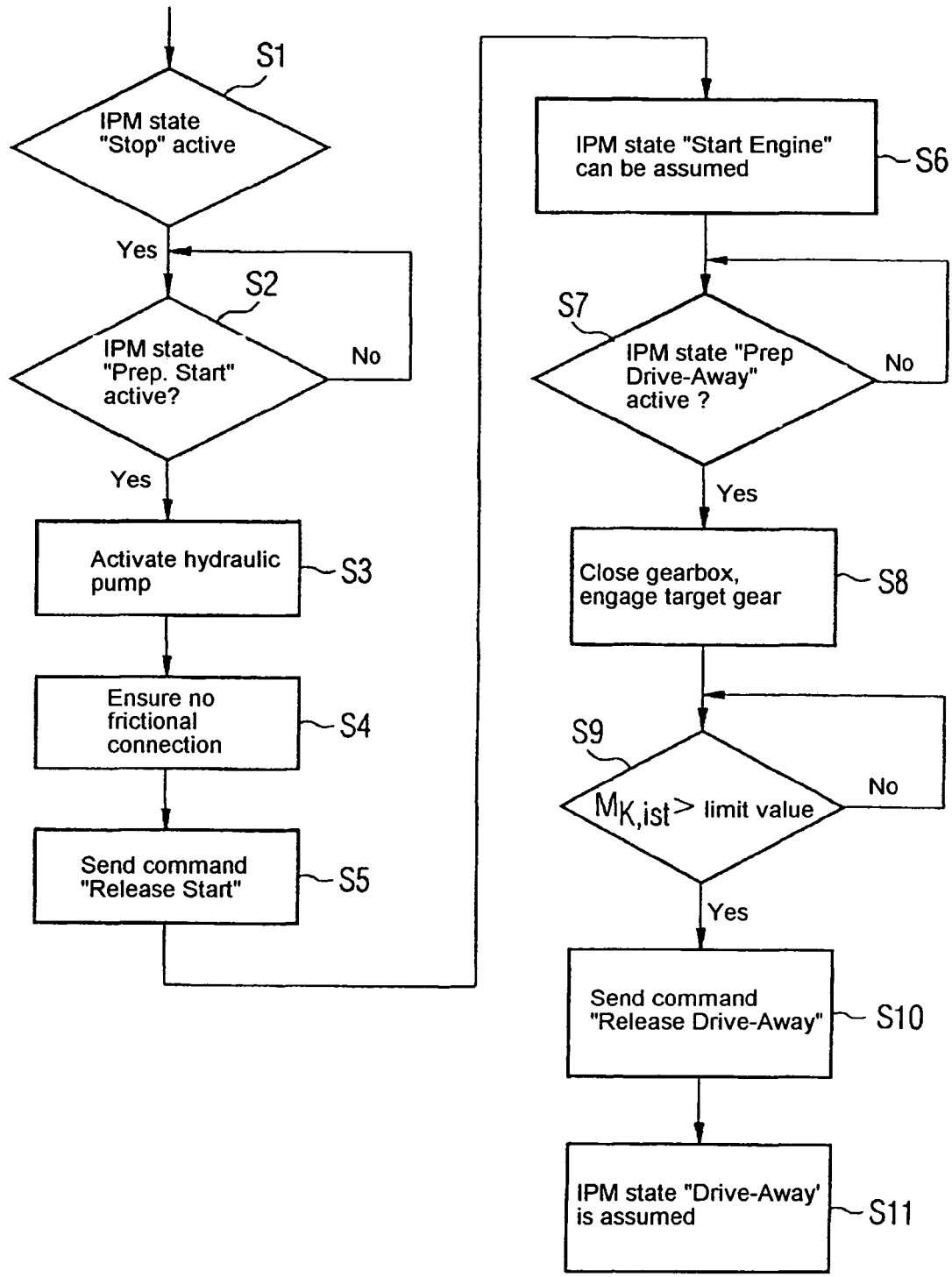

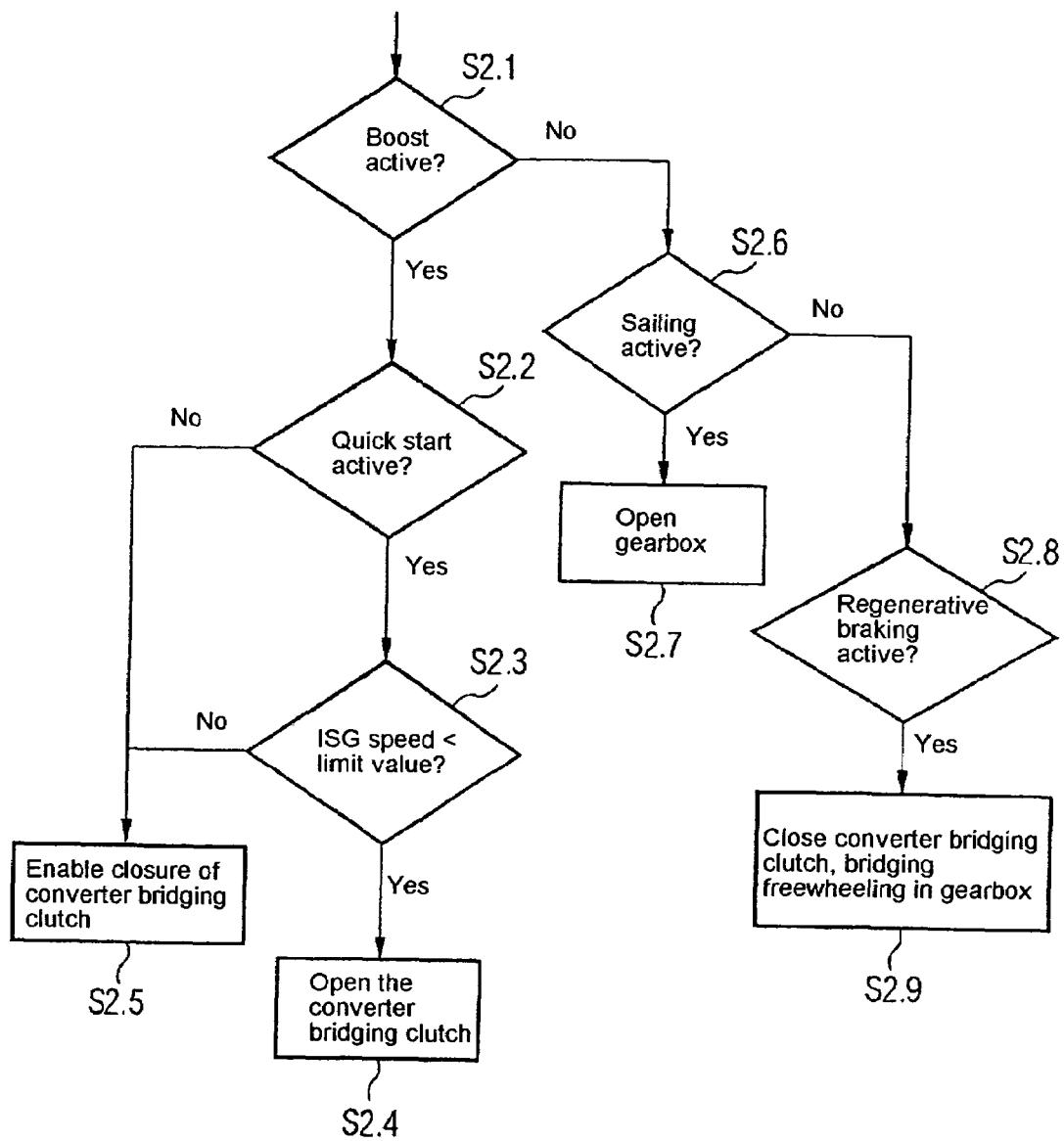

DRIVETRAIN ON A MOTOR VEHICLE AND METHOD FOR CONTROLLING A DRIVETRAIN

CROSS REFERENCE TO RELATED APPLICATION

This application is a continuation of copending International Application No. PCT/DE02/04559 filed Dec. 12, 2002 which designates the United States, and claims priority to German application no. 101 61 299.0 filed Dec. 13, 2001.

TECHNICAL FIELD OF THE INVENTION

The present invention generally relates to a drive train and a method for controlling a drive train. The drive train incorporates a first drive source, a second, electrical drive source, a hydrodynamic torque converter, an automatic gearbox and control facilities associated with these components.

DESCRIPTION OF RELATED ART AND BACKGROUND OF THE INVENTION

A known configuration of a drive train enables a significant saving in fuel consumption which is achieved in respect of a drive train having an automated manual gear-shift gearbox (Probst G. et al: "Architektur des Integrierten Antriebsstrangmanagement unter funktionellen Aspekten und mit Berücksichtigung der Steuergerätetopologie im Kraftfahrzeug" [architecture of integrated drive train management under functional aspects and with respect to the control equipment topology in the motor vehicle], 10th Aachen Colloquium "Automobile and Engine Technology" 2001, pp. 1027–1040). This configuration offers the advantage of an automatic clutch actuation which separates the drive unit from the output when the vehicle is at a standstill and on starting (so-called start-stop function).

SUMMARY OF THE INVENTION

The object of the invention is to create a drive train for a motor vehicle which, with a conventional automatic gearbox, particularly an automatic gearbox with planetary gear set, or also with a CVT gearbox, offers the same advantages as the known drive train having an automated manual gear-shift gearbox.

The object of the invention can be achieved by a drive train for a motor vehicle, comprising a first drive source, a second drive source, a hydrodynamic torque converter, an automatic gearbox and respective control facilities associated with these components, and a higher-level drive train control unit which comprises the following control modules: a driver and situation detection facility, a state control facility and a torque management system.

The following functions may be performed by the higher-level drive train control unit: a start-stop mode of operation for the motor vehicle, a drive source torque amplification, rolling of the motor vehicle in the case of a drive train with a friction-free connection, and regenerative braking operation. A crawl mode of operation for the motor vehicle can be controlled by the higher-level drive train control unit. The higher-level drive train control unit can be provided with a driver and driving situation detection facility which serves in the event of detection of deceleration or downhill travel to cause the drive train not to be opened and the converter bridging clutch to be closed, with the result that the battery of the motor vehicle is charged by the crankshaft starter generator. The second drive source may take the form of a crankshaft starter generator.

The object may also be achieved by a method for controlling a drive train for a motor vehicle, which comprises a first drive source, hydrodynamic torque converter and an automatic gearbox, comprising the steps of:
  when the first drive source is at a standstill and the motor vehicle is at a standstill and a drive train control unit is in a preparatory state for a start, activating a hydraulic pump,
  ensuring that the drive train has a friction-free connection,
  issuing a command enabling starting of the drive source by a gearbox control unit to the drive train control unit,
  when the drive train control unit is in the preparatory state for a drive-off operation, closing the drive train and engaging a target gear,
  making a check as to whether the gearbox capacity exceeds a predefined limit value, and
  if this is the case, sending an enabling command for the drive-off operation and the gearbox capacity to the drive train state control unit and, thus, assuming the drive-off state.

The object may also be achieved by a method for controlling a drive train for a motor vehicle, comprising the steps of:
  activating a hydraulic pump if a drive source is at a standstill and the motor vehicle is at a standstill and a drive train control unit is in a preparatory state for a start,
  ensuring that the drive train has a friction-free connection,
  issuing a command by a gearbox control unit to the drive train control unit which starts the drive source,
  closing the drive train and engaging a target gear if the drive train control unit is in the preparatory state for a drive-off operation,
  checking as to whether a gearbox capacity exceeds a predefined limit value, and
  if this is the case, sending an enabling command for the drive-off operation and sending the gearbox capacity to the drive train state control unit.

The gearbox can be opened by the gearbox control unit and after re-starting the drive source the gearbox is shifted from idling into a forward drive stage, whereupon the motor vehicle drives away. The gearbox, after it has received the command from the higher-level drive train control unit to establish a frictional connection, may make known to the latter how much torque the gearbox is able to accept, and a corresponding torque is then delivered by the drive source of the motor vehicle. The amplification of a drive source torque can be increased by a torque converter by virtue of the fact that this is open initially and thus also amplifies the torque of the crankshaft starter generator and produces an additionally increased drive-off torque.

The drive train has a higher-level drive train control unit which includes the following control modules: a driver and situation detection facility, a state control facility and a torque management system.

When the drive motor is at a standstill and the motor vehicle is at a standstill and the drive train control unit is in a preparatory state for a start, a hydraulic pump is activated. It must be ensured that the drive train has friction-free connection. A command enabling starting of the combustion engine is issued by a gearbox control unit to the drive train state control unit. When the drive train control unit is in the preparatory state for a drive-off operation, the drive train is closed and a target gear is engaged. A check is made as to whether the gearbox capacity exceeds a predefined limit value and, if this is the case, an enabling command for the drive-off operation and the gearbox capacity are sent to the drive train state control unit and the drive-off state is thus assumed.

The advantages of the invention lie particularly in the reduced fuel consumption and the associated environmental protection effects. In addition, the cooperation between the crankshaft starter generator and the gearbox is improved in different system states.

BRIEF DESCRIPTION OF THE DRAWINGS

Embodiments of the invention will be described in the following with reference to the drawings. In the drawings:

FIG. 4 shows a block diagram of the torque coordination between the higher-level drive train control unit and the gearbox control unit;

FIG. 5 shows a flowchart for a program processed with regard to the start-stop function, and FIG. 6 shows a flowchart for a program processed with regard to the functions: torque amplification, rolling in the case of a drive train with a friction-free connection, and regenerative braking.

DETAILED DESCRIPTION OF EMBODIMENTS

Figure 1:
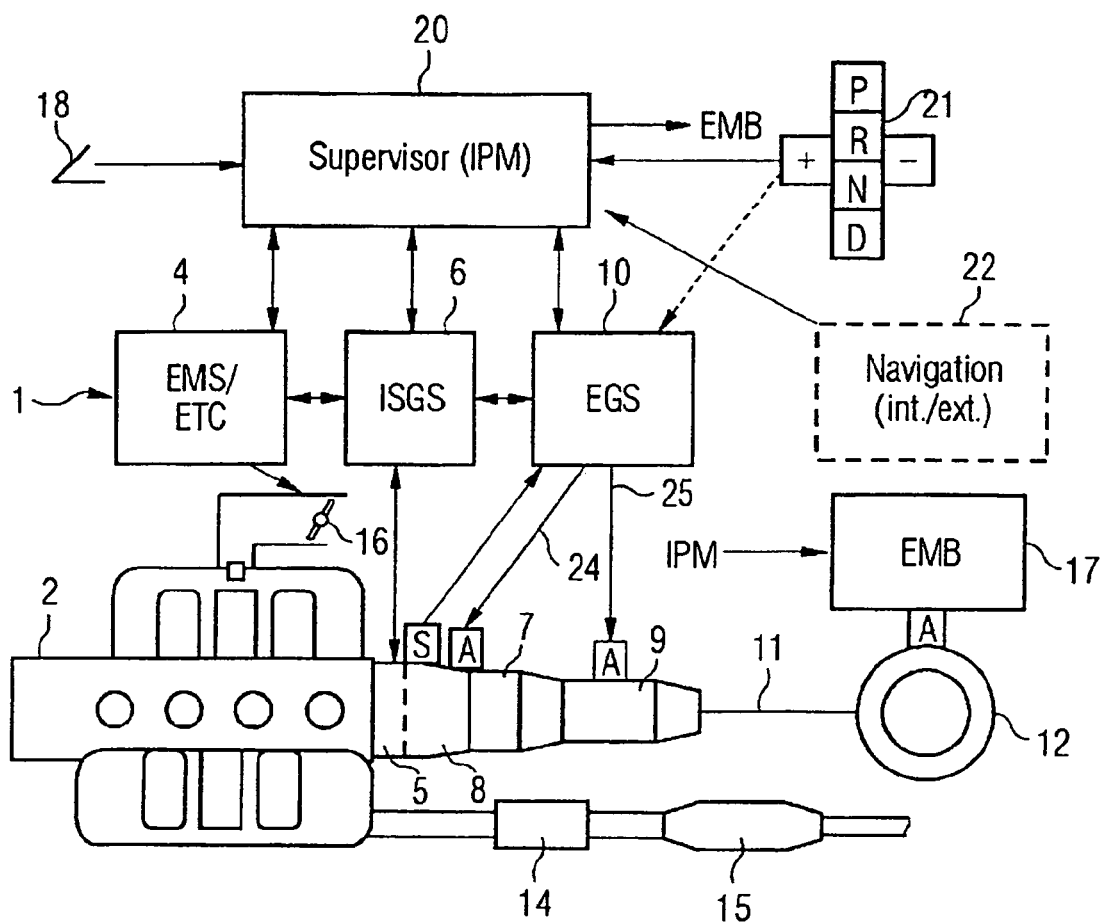
FIG. 1 shows a schematic representation of a drive train according to the invention.

A drive train 1 (FIG. 1) of a motor vehicle incorporates mechanical components which are represented in the lower part of the drawing, and control units which are represented in the upper part of the drawing: an internal combustion engine serving as a first drive source 2 with an electronic engine control unit (abbreviated as: EMS) 4, a crankshaft starter generator serving as a second, electrical drive source 5 (abbreviated as: ISG) with an associated control unit (ISGS) 6, a hydrodynamic torque converter 7 with a converter bridging clutch 8, and also an automatic gearbox 9 with an electronic gearbox control unit (EGS) 10. The drive to the wheels is indicated by means of a propeller shaft 11 and a driven wheel 12, the exhaust system is indicated by means of a catalytic converter 14 and a silencer 15. The hydrodynamic torque converter 7 and the converter bridging clutch 8 are represented here schematically side by side but they are in fact accommodated in a common housing.

The converter bridging clutch 7 has a sensor S for determining the turbine rotational speed and an actuator A which are both linked to the gearbox control unit 10. The gearbox control unit is linked to a plurality of actuators A in the gearbox 9, of which only one is shown in the drawing by way of example. The engine control unit 4 incorporates an electronic throttle-valve controller ETC which actuates a throttle valve 16. The wheels can be provided with an electromagnetic brake 17 and an associated control unit EMB.

The driver uses an accelerator pedal 18 to convey his wishes to a higher-level drive train control unit (IPM) 20—also referred to as the supervisor—which is linked to the individual control units for the drive train 1 by means of control and signal lines which can be seen from the drawing. For entering the driver commands, a selector lever 21 is used with the usual gear steps and park setting D, N, R and P and having two positions or buttons for shifting the gearbox up "+" or down "−" one gear at a time. As indicated by arrows EMB and IPM, a data link exists between the control unit EMB and the drive train control unit 20.

If a navigation system 22 is present, the drive train control unit 20 is also linked to this. Braking signals arising as a result of the dynamic driving situation, for example ABS and ESP signals, are produced by separate control devices which are grouped together in the drawing under the control device EMB for the electromagnetic brake.

In addition to the throttle valve 16 or another facility for controlling the intake air quantity, the engine control unit 4 controls the ignition timing, the injection timing and the quantity of fuel injected into the engine and/or the charging. This is not represented here in detail because the facilities for engine control are already known.

The gearbox control unit 10 controls the torque converter 7 by way of a signal line 24 and the gear ratio of the gearbox 9 by way of a signal line 25. The control units 4, 6, 10 and 20 are connected to one another by means of bidirectional signal and control lines which can be seen from the drawing, for example in the form of a data bus, and exchange information over these data lines which is required for comfortable and economical driving operation of the motor vehicle.

Figure 2:
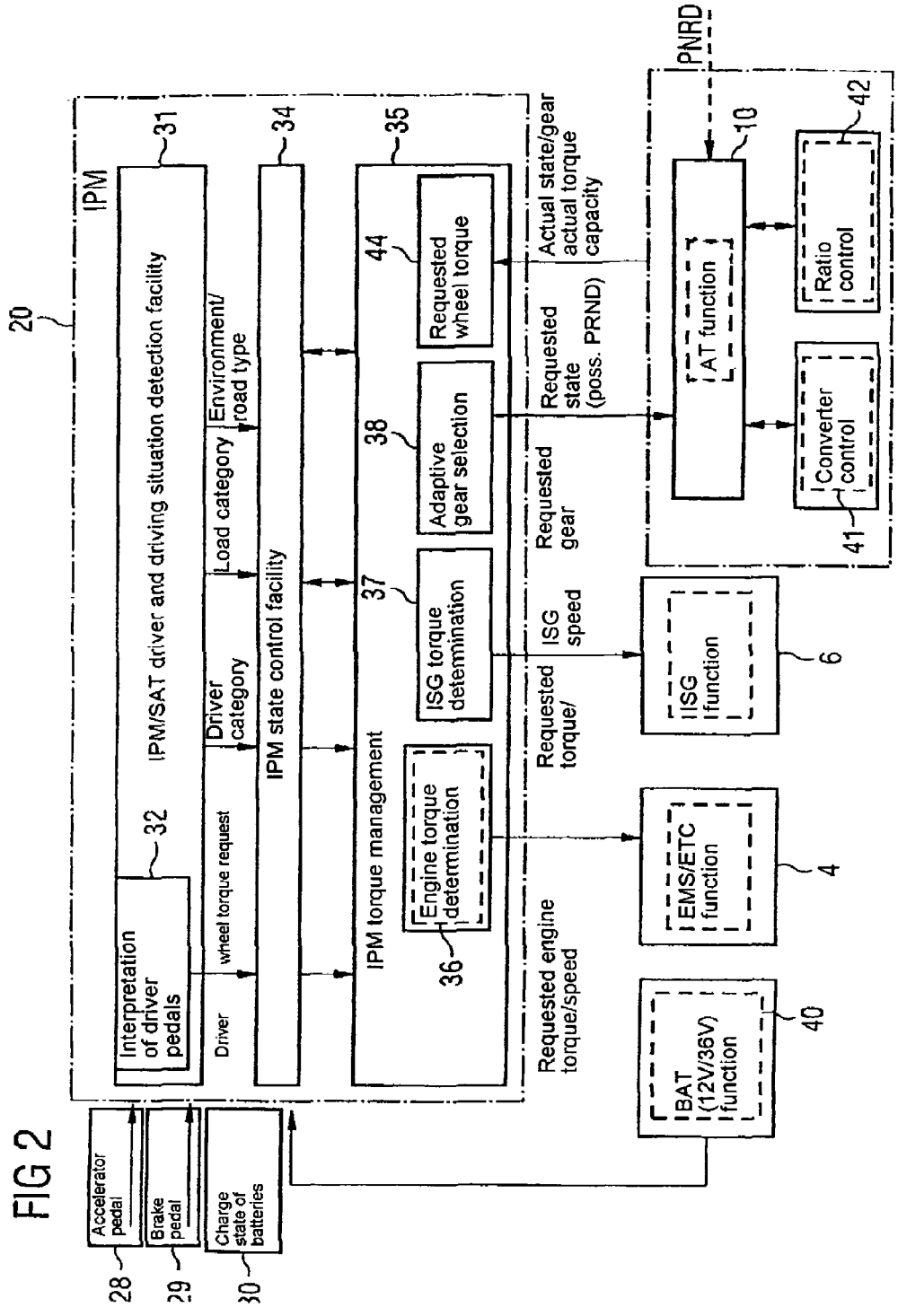
FIG. 2 shows the functional structure of a higher-level control unit for the drive train according to FIG. 1.

The functional structure or functional architecture of the drive train control unit which can be seen from FIG. 2 shows how the control functions are divided up amongst the individual components of the control unit, how these components interact and how information is exchanged and evaluated amongst and in the individual components respectively of the drive train control unit and in further components of the drive train. The signals determining the state in the drive train 1 in each case are also referred to as control state or IPM state in the following.

The higher-level drive train control unit 20 receives information 28, represented as blocks in the drawing, relating to the position of the accelerator or drive pedal and information 29 relating to the position of brake pedal and also information 30 relating to the charging state of the batteries in the motor vehicle. The information encompasses a plurality of function blocks which take the form of program blocks or subroutines: a driver and driving situation detection facility 31 which classifies the type of the driver on the basis of the information received (for example "careful" or "performance seeker") and registers the respective driving situation (for example "urban driving", "motorway" etc.). In addition, an interpretation 32 of drive pedal actuations is also performed.

Further function blocks in the higher-level drive train control unit 20 are a state control facility 34 which controls the driving and operating states of the drive train 1, and a torque management system 35 which defines a torque requirement 36 for the internal combustion engine 2, a torque requirement 37 for the crankshaft starter generator 5 and also defines the desired state of the gearbox 9, in other words carries out an adaptive selection 38 of the gearbox gear, and which also defines the state of the converter bridging clutch 8.

The higher-level drive train control unit 20 acts in conjunction with the individual controllers for the following functions of the drive train 1: Function 40 or BAT for monitoring and controlling the state of the batteries in the motor vehicle, function 4 or EMS/ETC for engine control with electronic engine performance control (ETC=electronic throttle control), function 6 or ISGS for controlling the starter generator 5, and function 10 or AT for controlling the automatic gearbox, consisting of functions 41 for controlling the converter bridging clutch and 42 for changing the gear ratio.

The individual controller AT function 10 evaluates the signals from the selection lever 21 for the automatic gearbox 9 and sends information to the torque management system 35 relating to the current state of the gearbox, such as the gearbox gear and the torque that can actually be transmitted by the gearbox. The latter information is required in order to be able to set the required wheel torque.

Figure 3:
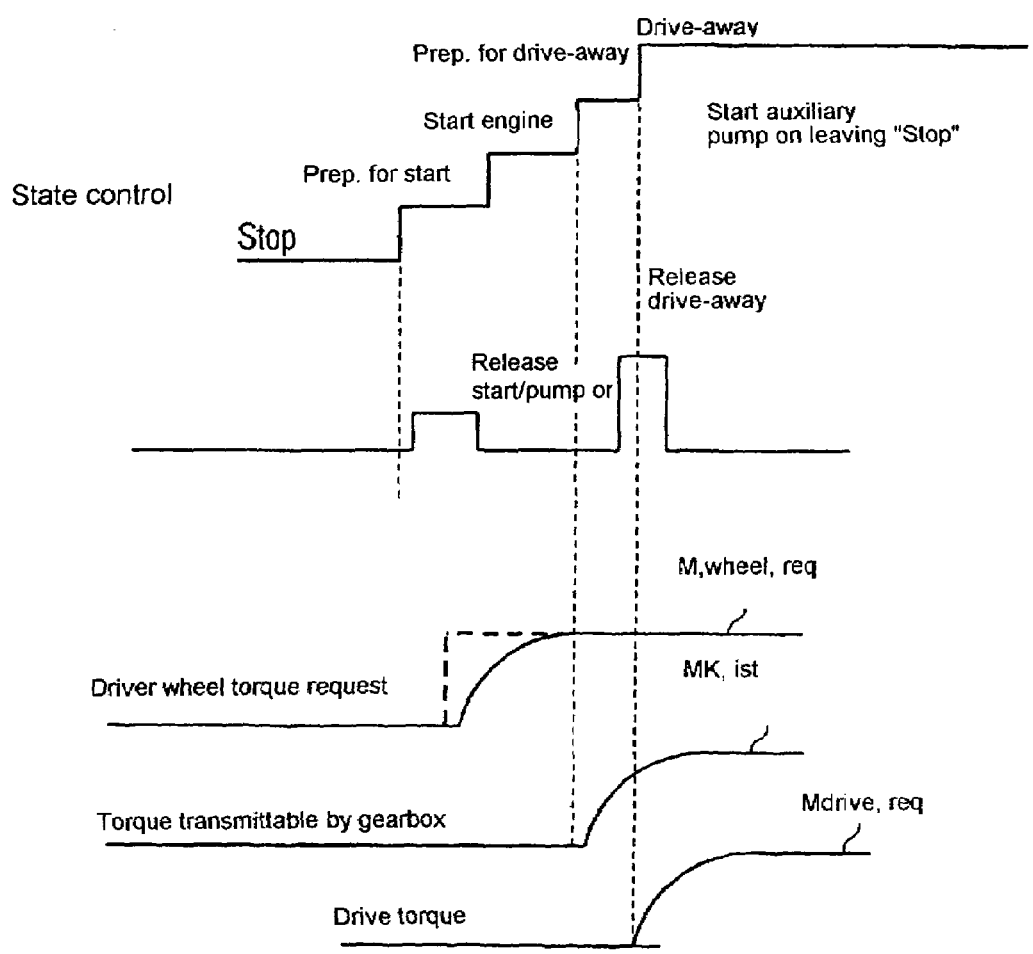
FIG. 3 shows a signal and state variable diagram for explaining the execution of a start-stop function.

The signal and state variable diagram which can be seen in FIG. 3 shows the execution of a start-stop function. The starting point for the situation illustrated is a stationary vehicle with its internal combustion engine turned off: "Stop" (upper area of the diagram). If the internal combustion engine is to be started again in order to drive off, initiated by releasing the brake pedal for example, the higher-level drive train control unit assumes the IPM state "Preparation for Start" and notifies this state to the other components in the drive train. As a result, an electrical hydraulic pump can be started (center area of the diagram).

The gearbox control unit places the gearbox in a state which allows starting with a friction free connection of the internal combustion engine, and issues a release in order to start the internal combustion engine. The higher-level drive train control unit IPM recognizes a driver-requested torque $M_{wheel,req}$ (lower area of the diagram) to be applied to the driven wheels which is requested by way of the accelerator pedal setting, or else a crawler torque when the accelerator pedal is not depressed. After starting the internal combustion engine, a gear suitable for starting up is engaged by the gearbox control unit in an IPM state "Preparation for Drive-off". In this situation, the gearbox state is reproduced by a torque $M_{K,ist}$ which can be transmitted by the gearbox, and a "Release Drive-off" signal is output, after which a drive torque $M_{drive,req}$ is set by the higher-level drive train control unit for drive-off.

In the block diagram which can be seen from FIG. 4 showing the torque coordination between the higher-level drive train control unit 20 and the gearbox control unit 10, the communication which takes place for this purpose between the two controllers is represented. The higher-level drive train control unit sends to the gearbox control unit—including a pump control unit 46 for the latter's hydraulic pump 47—the IPM state (cf. FIG. 3) and also the desired value $M_{k,soll}$ for the torque to be transmitted by the gearbox. In return, a gearbox and converter model 48 calculated in the gearbox control unit issues releases for "Start" and "Drive-off" and sends to the higher-level drive train control unit the currently set gear ratio $I_{ist}$ and also the actual value $M_{K,ist}$ for the maximum torque that can be transmitted by the gearbox at the main gearbox. The maximum torque that can be transmitted corresponds to the capacity set by the gearbox, and the main gearbox here means the input shaft of the torque converter.

The IPM state has the values "Stop", "Preparation for Start", . . . , "Drive-off" and "Crawl" described on the basis of FIG. 3. "Release Start" releases starting of the engine and indicates that the gearbox is shifted to a friction-free connection—but which is not necessarily load-free. "Release Drive-off" indicates that the gearbox is able to transmit the torque for the drive-off. The gear ratio $I_{ist}$ includes the current torque conversion in the hydrodynamic torque converter.

The flowchart which can be seen from FIG. 5 showing a program processed in relation to the start-stop function contains the following steps:

After the start of the program, indicated by means of an arrow, the program executes the following steps:

S1 checks whether the IPM state "Stop" is active. If this is the case, step

S2 checks whether the IPM state "Preparation for Start" is active. If this is not the case, the check is repeated until such time as the state is active. Then in step S3 the hydraulic pump is activated, and subsequently step S4 ensures that the drive train has a friction-free connection. Then in step S5 the command "Release Start" is issued. In step S6 the IPM state "Start Internal Combustion Engine" then comes into effect. Afterwards, step S7 checks whether the IPM state "Preparation for Drive-off" is active. If this is not the case, the check is repeated until such time as the response is Yes. Then in step S8 the gearbox is closed, in other words the drive train has a friction-free connection and the target gear is engaged. Then step S9 checks whether the torque $M_{K,ist}$ exceeds a predefined limit value. If this is not the case, the check is repeated until such time as the response is Yes. Then in step S10 a command "Release Drive-off" and the torque value $M_{K,ist}$ are sent. Finally, in step S11 the IPM state "Drive-off" comes into effect. The motor vehicle comes into motion.

This concludes one execution of the program.

The components of the drive train 1, between which the commands and signals mentioned above are exchanged, have been described with reference to FIG. 4.

The flowchart which can be seen from FIG. 6 showing a program processed in relation to the functions: torque amplification (or boost), rolling with the drive train having a friction-free connection (or sailing), and regenerative braking, contains the following steps:

After the start of the program, indicated by means of an arrow, the program executes the following steps:

S2.1 checks whether the IPM state "Boost", in other words increasing the torque by means of the hydrodynamic torque converter, is active. If this is the case, step S2.2 checks whether the state "Fast Start" is active. If this is the case, step S2.3 checks whether the ISG rotational speed lies beneath a predefined limit value. If this is the case, in step S2.4 converter bridging clutch is opened.

If the response to the query S2.2 or the query S2.3 is No, in step S2.5 closure of the converter bridging clutch is enabled.

If the check in step S2.1 yields the result that the IPM state "Boost" is not active, then step S2.6 checks whether the state "Sailing", in other words rolling of the motor vehicle with the drive train having a friction-free connection, is active. If this is the case, in step S2.7 the gearbox is opened, in other words the planetary gearing is opened directly by opening clutches, or freewheeling mechanisms are released, thereby interrupting the frictional connection in the drive train. If this is not the case, step S2.8 checks whether the state "Regenerative Braking", in other words braking with the recovery of electrical energy, is active. If this is the case, in step S2.9 the converter bridging clutch is closed and the freewheeling in the gearbox is bridged.

This concludes one execution of the program.

When using the drive train described above and the associated control facility, the start-stop and crawling functions of a motor vehicle can be implemented in two ways.

1. The gearbox is opened by the gearbox control unit (for example by actuating an internal wet clutch). After restarting the internal combustion engine, an N-D shift is carried out, in other words the automatic gearbox is shifted from neutral into the drive stage D, and the vehicle crawls or drives away.

With regard to this embodiment, no additional hydraulic pump is required since the gearbox is only closed when the engine is already running again. By carrying out measurements on an experimental vehicle, it has been determined that the time needed to build up the hydraulic pressure is negligibly small. In this situation, however, the drive train is open for a certain time after releasing the brake, in other words the vehicle can roll. This period of time corresponds to that in the case of an AMT system, in other words with regard to a motor vehicle having an automated manual gear-shift gearbox.

2. A gear remains engaged in the event of a stop: first gear if a fast start is desired, a higher gear in order to keep any jolt on starting up as small as possible. This procedure has the following advantage: A crawl torque is then already applied when the crankshaft starter generator or internal combustion engine begins to rotate. In this situation, however, an additional hydraulic pump is required, and a jolt or shock of undefined intensity is produced as a result of the starting operation.

The following variants exist in respect of the information exchange required for this purpose in the drive train:

a. The gearbox issues a release when it is ready to accept (full) torque after the starting operation. This is the simplest solution. In this situation, however, it is necessary to ensure that no torque is yet transmitted during engine start-up.

b. At the end of the stop phase, for example on releasing the brake pedal, the drive train or an integrated drive train control unit reports a torque request (as a binary or continuous signal), the gearbox sets its capacity in a defined time and reports it (as a binary or continuous signal). In this situation, it is necessary to ensure that on engine starting a signal value "0" is output and thus a friction-free connection is effected.

c. The variants a. and b. are combined: This results in an exchange of information in acknowledgment (or "handshake") mode.

d. After it has received the command from the higher-level drive train control unit to establish a friction-free connection, the gearbox makes known how much torque it is able to accept (determined by means of a model calculation). The drive train responds with a corresponding torque, whereby the "Master" function passes to the gearbox control unit for a short time.

e. The integrated drive train control unit 20 reports the basic state of the drive train 1 in order to thereby enable timely activation of an electrical auxiliary pump in the next operating state.

f. If an electromagnetically controlled braking system is present, the higher-level drive train control unit can influence the wheel torque (or its build-up) by way of a further interface. This is necessary in the situation when no defined torque build-up or no reliably reproducible torque build-up is able to be implemented in the gearbox. A "Release to drive off" thus occurs, as it were.

g. It is unimportant in this situation whether the gearbox shifts automatically between the stages N and D, whether it remains autonomous as is usual in the overwhelming majority of cases (including engagement of the R gear), or whether the central higher-level drive train control unit also specifies these operating modes.

The "Boost" function, in other words increasing the drive source or engine torque amplification by means of the torque converter 7, is implemented in the following manner in a first variant. The converter bridging clutch 8 (abbreviated as WK) is open at least initially. In this way, the torque of the crankshaft starter generator is also amplified in the torque converter and results in an additionally increased drive-off torque which could enable what is termed as a quick start. The rotational speed to be closed by WK can be determined from the characteristic of the torque as a function of the rotational speed of the internal combustion engine and of the crankshaft starter generator. In this embodiment, the converter can advantageously be implemented as a smaller design.

With regard to a second variant of the "Boost" function, the converter bridging clutch is closed and the requisite additional engine or drive source torque is delivered by the crankshaft starter generator. Losses resulting from the open torque converter during drive-off are not experienced here, with the result that the efficiency is better than in the case of the first embodiment. The decision as to which of the two variants is applied during drive-off is made by the higher-level drive train control unit 20, and this decision is dependent on the actuation of the accelerator pedal, the type of driver and the condition of the vehicle. A greater or smaller additional torque requirement results in each case from these variables.

The "Sailing" mode, in other words when the motor vehicle is rolling with an open drive train with a friction-free connection, is implemented in the following manner. The gearbox is opened. On termination of sailing, the drive train is closed again.

"Regenerative Braking" mode, in other words with recovery in the form of electrical energy of the kinetic energy released during braking, is implemented in the following manner. The converter bridging clutch is closed. If on the other hand a high actual braking torque is applied at the crankshaft starter generator for charging purposes, then the engine rotational speed would drop greatly with the converter bridging clutch open in overrun conditions, with the result that on the one hand the charging performance becomes poor and on the other hand the losses in the converter increase greatly (the braking torque at the wheel remains approximately the same). As a result of a closed converter bridging clutch, the engine rotational speed remains high and such problems do not occur.

As a result of possible freewheeling mechanisms, the gearbox is on occasions, open during overrun conditions. Here, a brake parallel to the freewheeling mechanism must be closed by means of a corresponding command from the drive train control unit to the gearbox control unit or a different gear engaged by shifting involvement of freewheeling mechanisms.

Charging of the battery during downhill travel or deceleration is implemented in the following manner. If the driver and driving situation detection facility 31 recognizes a deceleration or downhill travel driving state (roadway gradient<limit value<0), then the drive train is not opened for sailing, but instead the battery is charged. In the case of regenerative braking, the converter bridging clutch is to be closed.

We claim:

1. A drive train for a motor vehicle, said train comprising:
a first drive source,
a second drive source,
a hydrodynamic torque converter,
an automatic gearbox, respective control facilities associated with the first and second drive sources, converter and gearbox, and a higher-level drive train control unit, said unit comprising a driver and situation detection facility, wherein the driver and situation detection facility is operable, in the event of detection of downhill travel or in the event of recognizing deceleration, to cause the drive train not to be opened and a converter bridging clutch to be closed such that a battery is charged by the second drive source, wherein the driver and situation detection facility is further operable to automatically classify a driver as one of a plurality of types of drivers based on inputs received from the driver, and wherein the higher-level drive train control unit is operable, in a state in which the first drive source provides a torque to the automatic gearbox, to determine whether to close the converter bridging clutch to activate the second drive source to increase the amount of torque provided by the first drive source, based at least on the type of the driver classified by the driver and situation detection facility.

2. A drive train according to claim 1, wherein the following functions are performed by the higher-level drive train control unit: a start-stop mode of operation for the motor vehicle, a drive source torque amplification, rolling of the motor vehicle in the case of a drive train with a friction-free connection, and regenerative braking operation.

3. A drive train according to claim 1, wherein a crawl mode of operation for the motor vehicle is controlled by the higher-level drive train control unit.

4. A drive train according to claim 1, wherein the second drive source comprises a crankshaft starter generator.

5. A drive train according to claim 1, wherein:

the gearbox is operable to:
  receive a command from the higher-level drive train control unit to establish a frictional connection for driving the motor vehicle; and
  communicate to the higher-level drive train control unit a gearbox torque capacity, the gearbox torque capacity defining the amount of torque the gearbox is capable of accepting; and the higher-level drive train control is operable to control at least one of the first and second drive sources to deliver torque to the gearbox based at least on the gearbox torque capacity communicated by the gearbox.

6. A drive train according to claim 1, wherein the higher-level drive train control is operable to:

determine whether the gearbox torque capacity exceeds a predefined limit value; and if the gearbox torque capacity exceeds the predefined limit value, communicate a command to a drive train state control unit to enable the motor vehicle to enter a drive-off state.

7. A drive train according to claim 1, wherein:

the first drive source comprises an internal combustion engine; and the second drive source comprises a crankshaft starter generator.

* * * * *